(12) United States Patent
Ansari et al.

(10) Patent No.: US 11,116,236 B2
(45) Date of Patent: Sep. 14, 2021

(54) BEVERAGE PRECURSOR AND METHOD OF MAKING SAME

(71) Applicant: Conopco Inc., d/b/a UNILEVER, Englewood Cliffs, NJ (US)

(72) Inventors: Mansoor Ahmed Ansari, Sharnbrook (GB); Andrew Paul Ormerod, Sharnbrook (GB); Benjamin Jesukumar Rajapandian, Bebington (GB)

(73) Assignee: Conopco Inc., Englewood Cliffs, NJ (US)

( * ) Notice: Subject to any disclaimer, the term of this patent is extended or adjusted under 35 U.S.C. 154(b) by 251 days.

(21) Appl. No.: 16/475,703

(22) PCT Filed: Nov. 22, 2017

(86) PCT No.: PCT/EP2017/080125
§ 371 (c)(1),
(2) Date: Jul. 3, 2019

(87) PCT Pub. No.: WO2018/127325
PCT Pub. Date: Jul. 12, 2018

(65) Prior Publication Data
US 2019/0343142 A1 Nov. 14, 2019

(30) Foreign Application Priority Data
Jan. 9, 2017 (EP) .................................... 17150626

(51) Int. Cl.
*A23F 3/14* (2006.01)
*A23F 3/32* (2006.01)
*A23F 3/40* (2006.01)

(52) U.S. Cl.
CPC .................. *A23F 3/14* (2013.01); *A23F 3/32* (2013.01); *A23F 3/40* (2013.01); *A23V 2002/00* (2013.01)

(58) Field of Classification Search
CPC ..... A23F 3/14; A23F 3/32; A23F 3/40; A23V 2002/00
See application file for complete search history.

(56) References Cited

U.S. PATENT DOCUMENTS

2006/0219183 A1* 10/2006 Yasukawa ............ A01K 1/0154
                                                          119/171
2010/0086642 A1   4/2010 Colliver et al.
(Continued)

FOREIGN PATENT DOCUMENTS

EP        0530880       3/1993
IN        187 547 B     5/2002
(Continued)

OTHER PUBLICATIONS

Albrecht, et al.; Processing of Phase Doppler Data; Laser Doppler and Phase Doppler Measurement Techniques; 2003; pp. 1,2, 598 (total of 3).
(Continued)

*Primary Examiner* — Anthony J Weier
(74) *Attorney, Agent, or Firm* — Foley & Lardner LLP

(57) ABSTRACT

The invention provides porous tea granules including leaf tea particles and binder, wherein at least 50% by weight of the leaf tea particles have a particle size of 100 μm to 300 μm; the binder is a tea-based binder including tea solids; the tea granules including binder in an amount of 1 to 40% by dry weight; and the porous tea granules have a D[4,3] of more than 350 μm.

15 Claims, 2 Drawing Sheets

(56) References Cited

U.S. PATENT DOCUMENTS

| | | | | |
|---|---|---|---|---|
| 2011/0217417 | A1* | 9/2011 | Perlman | A23G 1/48 |
| | | | | 426/72 |
| 2014/0234517 | A1 | 8/2014 | Lian Hwee Peng et al. | |
| 2015/0068545 | A1* | 3/2015 | Moldoveanu | A24B 13/00 |
| | | | | 131/352 |
| 2016/0255854 | A1 | 9/2016 | Rousseau | |
| 2018/0255801 | A1* | 9/2018 | Victor | A24B 13/00 |

FOREIGN PATENT DOCUMENTS

| | | |
|---|---|---|
| JP | 5942846 | 3/1984 |
| JP | 2005224142 | 8/2005 |
| KR | 20140121984 | 10/2014 |
| SU | 1253574 | 8/1986 |
| SU | 1472036 | 4/1989 |
| SU | 1595428 | 9/1990 |
| WO | 2006/085710 A1 | 8/2006 |

OTHER PUBLICATIONS

International Search Report and Written Opinion in PCT/EP2017/080125 dated Mar. 1, 2018.
Extended European Search Report in EP17150626.4 dated Jun. 29, 2017.

* cited by examiner

BEVERAGE PRECURSOR AND METHOD OF MAKING SAME

TECHNICAL FIELD OF THE INVENTION

The present invention relates to beverage precursors for preparing tea-based beverages. In particular, the invention relates to tea granules for use in such precursors.

BACKGROUND OF THE INVENTION

Tea has been consumed for centuries and is popular in both developed and developing countries. After water, tea is the most widely consumed beverage in the world. The popularity of tea is influenced by a number of factors: it is generally regarded as healthy, it can be a safe alternative to untreated water, it is associated with benefits such as relaxation and mental alertness, and it has a widely acceptable taste.

The health benefits of tea are primarily attributed to the presence of high levels of polyphenols. Both black tea and green tea are rich in polyphenols, which can include catechins, theaflavins, and thearubigins.

Tea-based beverages are traditionally produced by infusing tea leaves in hot water and separating the infusion liquor from the spent tea material. Tea polyphenols are believed to contribute to the sensory properties of the infusion liquor. Unfortunately, a significant proportion of the tea polyphenols are not released into the infusion liquor, and are thus discarded with the spent tea material. Thus there is scope for providing a beverage precursor with improved infusion performance.

IN 187547 (Hindustan Lever Limited) relates to a process of granulating dust tea with sugar based additives to obtain a homogenous product resembling leaf tea. The infusion performance of the products is not disclosed, although the samples are said to have organoleptic attributes (e.g. taste, mouth feel, tea character) that are comparable to those from standard packed tea when prepared in the traditional Indian manner (boiling 1.2 litres of water along with 45 g of jaggery for 3 minutes, adding 7.75 g of the appropriate tea sample, and boiling for a further 15 minutes). The granulated tea product of IN 187547 comprises jaggery (a type of traditional non-centrifugal cane sugar) as the binder in an amount of 30 to 85% by weight. Thus, although this granulated product may be suitable for the Indian market, it is not suitable for markets where unsweetened tea beverages are preferred. Furthermore, since the binder is sugar-rich (the predominant components of jaggery are sucrose, glucose, fructose and water), both the binder itself and the resulting granules are likely to be hygroscopic and thus difficult to handle on a large scale. For example, the granules may aggregate into solid masses which can impede the operation of a production line or even lead to machine breakdown.

Today's health conscious consumer does not want products containing large amounts of sugar. Furthermore, consumers increasingly desire "clean label" products, i.e. products which only contain natural ingredients.

We have recognised that there is still a need to provide beverage precursors with improved infusion performance, which do not provide unwanted flavours to the beverage (such as excessive sweetness), and which only include natural ingredients.

SUMMARY OF THE INVENTION

In a first aspect, the present invention relates to porous tea granules comprising leaf tea particles and binder, wherein:

at least 50% by weight of the leaf tea particles have a particle size of 100 to 300 μm;
the binder is a tea-based binder comprising tea solids;
the tea granules comprise binder in an amount of 1 to 40% by dry weight; and
the porous granules have a D[4,3] of more than 350 μm.

Consumers often have a preference for teas with a fast infusion rate and strong liquor colour. One of the aims of the present invention is to allow consumers to produce a beverage using a smaller amount of tea material and/or requiring a shorter preparation time compared to conventional leaf tea.

Without wishing to be bound by theory, the inventors believe that the structural components and low surface area to volume ratio of conventional leaf tea limits its infusion performance. Reducing the particle size of leaf tea is thought to improve infusion performance by reducing the structural barriers and increasing the surface area to volume ratio. However, merely using small leaf particles (or incorporating small leaf particles into an existing blend) is undesirable for several reasons. Firstly, consumers typically associate small leaf particles with poor quality teas. Secondly, small leaf particles can have a negative impact on infusion liquor (e.g. increased haze). Furthermore, small leaf particles can lead to technical challenges (such as increased bag sift) when incorporated into tea bags. The porous granules of the present invention have improved infusion performance, whilst being of a size which limits the negative aspects typically associate with small leaf particles.

In a second aspect, the present invention relates to a beverage precursor comprising the porous tea granules of the first aspect of the invention. Such a beverage precursor allows a consumer to produce a beverage in an efficient manner, e.g. by requiring a shorter brewing period when compared to conventional leaf tea. Additionally or alternatively, the beverage precursor may be more economical, e.g. it may allow a reduction of the amount of the beverage precursor required to achieve a particular infusion performance when compared to conventional leaf tea.

In a third aspect, the present invention relates to a process for manufacturing porous tea granules, the process comprising the steps of:
(a) providing leaf tea;
(b) grinding and/or sieving the leaf tea such that at least 50% by weight of the leaf tea has a particle size of 100 to 300 μm;
(c) forming a mixture comprising the leaf tea obtained in step (b) and binder;
(d) forming porous granules from the mixture by low-shear granulation;
wherein the porous tea granules have a D[4,3] of more than 350 μm and wherein the binder is a tea-based binder comprising tea solids.

The process is preferably used to manufacture the porous tea granules of the first aspect of the invention. It should be noted that it is possible for steps (c) and (d) to be performed separately or simultaneously. From the standpoint of process efficiency, it is preferred that steps (c) and (d) are performed simultaneously.

SUMMARY OF THE DRAWINGS

The invention will be described with reference to the accompanying drawings in which.

DETAILED DESCRIPTION

Tea

Figure 1:
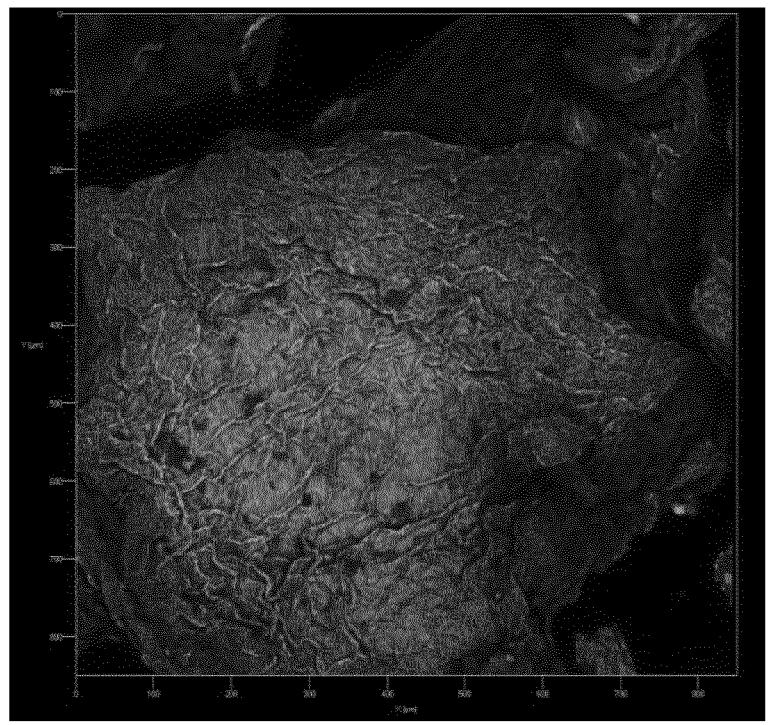
FIG. 1 is a confocal micrograph of conventional black leaf tea.

"Tea" for the purpose of the present invention means material from *Camellia sinensis* var. *sinensis* and/or *Camellia sinensis* var. *assamica*. The term "leaf tea" refers to leaf and/or stem material from the tea plant in an uninfused form (i.e. has not been subjected to a solvent extraction step). Leaf tea is dried to a moisture content of less than 30 wt. %. Typically, leaf tea has a moisture content of 1 to 10 wt. %.

Leaf Tea Particles

The leaf tea particles can comprise green leaf tea, black leaf tea, or oolong leaf tea. They may also comprise a blend of one or more of these types of leaf tea. "Green leaf tea" refers to substantially unfermented leaf tea. "Black leaf tea" refers to substantially fermented leaf tea. "Oolong leaf tea" refers to partially fermented leaf tea. "Fermentation" refers to the oxidative and hydrolytic process that tea undergoes when certain endogenous enzymes and substances are brought together. During this process colourless catechins in the leaves are converted to a complex mixture of yellow/orange to dark brown polyphenolic substances.

National or regional culture often dictate consumer preferences with respect to tea. For example, green tea beverages have been consumed in China and Japan for many hundreds of years, whilst in Europe and India black tea beverages are more popular.

Consumers in regions with a tradition of black tea consumption often have a preference for teas with a fast infusion rate and strong liquor colour. In order for the tea granules to help provide beverage precursors that meet this consumer need, it is preferred that the leaf tea particles are black leaf tea particles.

In recent years, there has been considerable interest in the potential health benefits of compounds present in green tea (particularly the flavanols such as catechins). In order for the tea granules to aid in delivering such benefits, it is preferred that the leaf tea particles are green leaf tea particles.

Naturally, some consumers will want the best of both worlds. Therefore, it is also envisaged that the tea granules could contain a mixture of black leaf tea particles and green leaf tea particles.

At least 50% by weight of the leaf tea particles have a particle size of 100 to 300 μm. Preferably at least 65% by weight of the tea particles have this particle size, more preferably at least 80% by weight of the tea particles have this particle size, still more preferably at least 90% by weight of the tea particles have this particle size, and most preferably at least 95% by weight of the tea particles have this particle size. This particle size can be achieved in a number of ways. For example, by grinding or milling leaf tea to an appropriate size and/or by sorting the leaf tea according to particle size.

The weight percentage of particles having a particular particle size can be determined by sorting the tea into fractions according to particle size (e.g. by sieving) and then weighing the fractions. When determining particle size, the leaf tea particles are in a dried format and have a moisture content of less than 30% by weight (typically 1 to 10% by weight).

Leaf tea contains material having a range of particle sizes as a result of the normal manufacturing process. Indeed, leaf tea is typically sorted into various grades (e.g. whole leaf, brokens, fannings and dusts) prior to being sold at auction. One way of sorting tea is according to particle size. For example, the leaf tea may be passed through a series of vibrating screens where the various grades are retained and collected. Leaf tea particles having a particle size of 100 to 300 μm could be separated in this manner. For example, particles which passed through a screen having a Tyler mesh size of 48 mesh (297 μm), and were retained by a screen having a Tyler mesh size of 150 mesh (105 μm), would have an appropriate particle size.

Up to 50% of the leaf tea particles can have a particle size that does not fall within the range of 100 to 300 μm. Usually, such tea particles will have a particle size below 100 μm, since removing very small particles following grinding and/or sieving is inconvenient, and such small particles do not tend to have a commercial value. However, without wishing to be bound by theory, we believe that when the tea granules are brewed in hot water, some disintegration of the granules may occur. Thus, large amounts of particles having a particle size below 100 μm are undesirable since these would not be retained by either a tea strainer or an infusion packet and could therefore impart unwanted haziness and/or precipitate to the brewed liquor. Therefore, it is preferred that the tea granules comprise leaf tea particles having a particle size of less than 100 μm in an amount of less than 30% by weight, more preferably less than 20% by weight, still more preferably less than 10% by weight, and most preferably less than 5% by weight.

Without wishing to be bound by theory, we believe that leaf tea particles having a particle size of greater than 300 μm are likely to have a negative impact on the infusion performance of the porous tea granules due to the fact that they have a reduced surface area to volume ratio when compared with smaller leaf tea particles. Since leaf tea particles with a particle size of greater than 300 μm are more easily removed following grinding and/or sieving, it is possible to ensure than only a minor amount of particles of this size will be present in the granules. Preferably the tea granules comprise leaf tea particles having a particle size of greater than 300 μm in an amount of less than 15% by weight, more preferably less than 10% by weight, still more preferably less than 5% by weight, and most preferably less than 1% by weight.

The leaf tea particles are substantially insoluble. As used herein the term "substantially insoluble" refers to a substance that will not dissolve when steeped or soaked in an aqueous liquid such as water. The substance may nonetheless release certain water-soluble substances when steeped or soaked in water (e.g. flavour and/or aroma molecules). Furthermore, as mentioned above, there is the possibility that some disintegration of the tea granules may occur when they are brewed.

Binder

The binder is a tea-based binder comprising tea solids. As used herein the term "tea solids" refers to water-soluble solids obtained from a tea source. The tea solids are conveniently provided by a liquid tea composition. The tea solids are preferably black tea solids, green tea solids, or a combination thereof.

For example, one particularly preferred option is to use a tea extract as the binder. In other words, the liquid tea composition is an extract of leaf tea, preferably an aqueous extract of leaf tea. The tea extract may conveniently be provided by directly extracting leaf tea with a solvent, preferably an aqueous solvent. It may be appropriate for the liquid tea composition to be a concentrated tea extract, in which case the tea extract will be concentrated by removing solvent therefrom. An alternative way of providing a tea extract is to dissolve tea powder in a solvent, preferably an aqueous solvent. Preferably the tea extract is black tea extract, green tea extract, or a combination thereof. Black tea extract is particularly preferred.

Another preferred option is to use tea juice as the binder. In other words, the liquid tea composition is an expressed tea juice. As used herein the term "expressed tea juice" refers to juice which has been squeezed out of fresh tea leaves and/or dhool using physical force (as opposed to extraction of tea solids with the use of a solvent). Thus "expressing" encompasses such means as squeezing, pressing, wringing, spinning, and extruding. "Fresh tea leaves" refers to tea leaves and/or stem that have never been dried to a moisture content of less than 30% by weight. "Dhool" refers to macerated fresh tea leaves. During the expression step, the moisture content of the fresh tea leaves and/or dhool is between 30 and 90% by weight, more preferably between 60 and 90% by weight. Further details of expressed tea juice and its production can be found, for example, in WO 2009/059924 (Unilever), WO 2009/059926 (Unilever) and WO 2009/059927. Preferably the tea juice is black tea juice, green tea juice, or a combination thereof.

Tea juices tend to have a lower proportion of gallated species in the polyphenols than conventional tea extracts. For example, black tea juice typically comprises theaflavins, wherein the weight ratio of theaflavin (TF1) to theaflavin digallate (TF4) is at least 2.0, more preferably at least 3.0, more preferably still at least 3.2 and most preferably from 3.5 to 5.0.

Green tea juice typically comprises catechins, wherein the weight ratio of non-gallated catechins to gallated catechins is greater than 1.4:1, more preferably greater than 1.6:1, more preferably still greater than 1.8:1 and most preferably from 3:1 to 20:1. Definitions of the terms "theaflavins" and "catechins" as well as suitable methods for determining the content of theaflavins and catechins in tea juice can be found in WO 2009/059927 (Unilever).

The binder can also comprise tea solids from different sources. For example, the liquid tea composition can be a combination of tea extract and tea juice.

The balance of the binder other than tea solids will typically be water. Preferably at least 90% by weight of the total solids content of the binder are tea solids, more preferably at least 95%, and most preferably at least 99%

The amount of binder in the tea granules is in the range of 1 to 40% by dry weight. The amount of binder should be sufficient to ensure that the leaf tea particles adhere together to form the tea granules. Therefore, the tea granules preferably comprise binder in an amount of at least 5%, more preferably at least 10%, still more preferably at least 11% and most preferably at least 12% by dry weight. High amounts of binder can be undesirable, for example high levels may add unwanted cost and/or introduce flavour notes that may be perceived as being too strong. Therefore, it is preferred that the tea granules comprise binder in an amount of no more than 35%, more preferably no more than 30%, still more preferably no more than 25%, and most preferably no more than 20% by dry weight.

Porous Tea Granules

Figure 2:
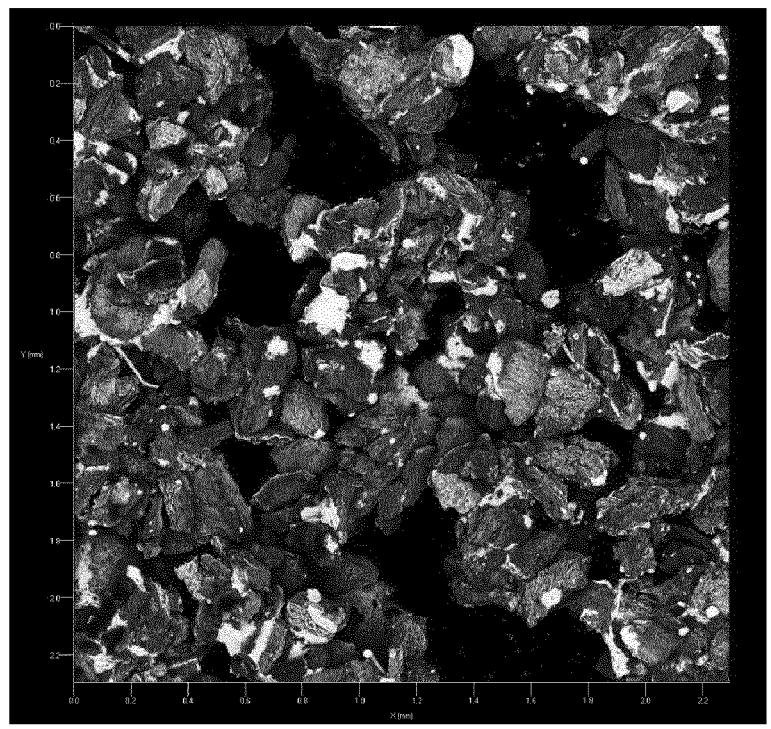
FIG. 2 is a confocal micrograph of a porous tea granule.

The tea granules according to the present invention are porous. Such porous granules have a more open structure than the natural cellular structure of a typical leaf tea particle. The porous nature of the granules can be seen using microscopy. FIGS. 1 and 2 show the structural differences between normal black leaf tea (FIG. 1) and a porous tea granule according to the invention (FIG. 2).

FIG. 1 is a confocal image of normal black leaf tea. The cuticle and cut surface of a single leaf piece can be discerned in this image, with the cuticle being a large proportion of the total piece surface.

FIG. 2 is a confocal image of a tea granule according to the present invention. An agglomeration of many smaller particles (with gaps clearly visible between the constituent particles) can be clearly seen in this image. The granule has an open (porous) structure, with the majority of the exposed surfaces being cut surfaces rather than cuticle surfaces.

The porous tea granules have a D[4,3] of more than 350 μm. The volume moment mean D[4,3] reflects the size of those particles which constitute the bulk of the sample volume. The porous granules of the present invention have a size which limits the negative aspects typically associated with small leaf particles (e.g. consumer acceptance, ease of handling in a factory environment, etc). For example, the sizing of the porous granules is associated with improved consumer acceptance in terms of infusion liquor properties (e.g. lower haze) and/or product appearance. In order to maximise such benefits, the D[4,3] is preferably more than 400 μm, more preferably more than 450 μm and most preferably more than 500 μm.

A Malvern Mastersizer 2000 with Scirocco was used for particle size characterisation of both un-granulated and granulated tea particles. The Scirocco is a dry dispersion unit with a variable vibration feed rate and dispersing pressure. For smaller particles and larger granules, a dispersing pressure of 2.0 bar and 0.5 bar was used, respectively. The vibration feed rate was kept at 40% for both cases. The Mastersizer 2000 software controls the system during the measurement process and analyses the scattering data to calculate volumetric size distribution.

As set out above, the tea granules can contain black leaf tea particles, green leaf tea particles or a mixture of black leaf tea particles and green leaf tea particles. Furthermore, the binder can comprise black tea solids, green tea solids, or a combination thereof. Thus it will be apparent that the tea granules can comprise any combination of leaf tea particles and binder envisaged.

Since having a fast infusion rate and a strong infusion colour is a common consumer preference in countries with a tradition of drinking black tea, it is particularly preferred that the tea granules comprise black leaf tea particles and that the binder comprises black tea solids.

Beverage Precursor

The present invention also relates to a beverage precursor comprising the porous tea granules. As used herein the term "beverage precursor" refers to a fabricated composition suitable for preparing a beverage.

The beverage precursor may be contacted with an aqueous liquid such as water to provide a beverage. This process is referred to as brewing. Brewing can be carried out at any temperature, although preferably the brewing temperature is at least 40° C., more preferably at least 55° C., most preferably at least 70° C. Preferably the brewing temperature is less than 120° C., more preferably less than 100° C.

A beverage is defined as a substantially aqueous drinkable composition which is suitable for human consumption. Preferably the beverage comprises at least 85% by weight water, more preferably at least 90% water, and most preferably 95 to 99.9% water.

As well as the porous tea granules, it is preferred that the beverage precursor additionally comprises leaf tea. The meaning of the term "leaf tea" is set out above under the heading "Tea".

At least 90% by weight of the leaf tea has a particle size of −5+30 mesh. Preferably at least 90% by weight of the leaf tea has a particle size of −5+25 mesh, more preferably at least 90% by weight of the leaf tea has a particle size of −5+20 mesh.

For the purpose of the present invention, the particle size of leaf tea is characterised by sieve mesh size. Tyler mesh sizes are used throughout (see Table 1). Where the symbol "+" is present before the mesh size, this indicates that the particles are retained by a sieve having this mesh size. Where the symbol "−" is present before the mesh size, this indicates that the particles pass through a sieve having this mesh size. The leaf tea is typically dried prior to sieving. For example, if the particle size is described as −5+30 mesh, then the particles will pass through a 5 mesh sieve (particles smaller than 4.0 mm) and be retained by a 30 mesh sieve (particles larger than 595 μm).

TABLE 1

Selected Tyler mesh sizes

| | Tyler mesh size | | | | |
|---|---|---|---|---|---|
| | 5 mesh | 20 mesh | 25 mesh | 30 mesh | 48 mesh | 150 mesh |
| Opening size | 4.0 mm | 841 μm | 707 μm | 595 μm | 297 μm | 105 μm |

The beverage precursor is preferably packaged. For convenience of use, it is particularly preferred that the beverage precursor is packaged in an infusion packet (e.g. a tea bag). Such an infusion packet comprises porous material. The porous material can be any material that is suitable for enabling water to permeate the packet without allowing insoluble contents to leave the packet. Examples of suitable material include filter paper, nylon mesh, gauze, muslin, nonwoven fabric, although any other similar material or fabric may also be used. As such, when the beverage precursor is packaged in an infusion packet, it is preferred that substantially all of the porous tea granules will be retained within the infusion packet.

To allow for long-term storage stability, the beverage precursor preferably comprises less than 15% water by weight, more preferably less than 10%, and most preferably from 0.1 to 5%. It will be understood that these amounts refer to the water content prior to using the beverage precursor to produce a beverage (i.e. prior to brewing).

Other ingredients which are commonly used to flavour beverage precursors comprising leaf tea (e.g. bergamot, citrus peel, and the like) may optionally be combined with the tea granules and leaf tea in the beverage precursor of the present invention. For example, the beverage precursor may additionally comprise herb plant material. The term "herb plant material" refers to material which is commonly used as a precursor for herbal infusions. Preferably the herb plant material is selected from chamomile, cinnamon, elderflower, ginger, hibiscus, jasmine, lavender, lemongrass, mint, rooibos, rosehip, vanilla and verbena.

The beverage precursor may additionally or alternatively comprise fruit pieces (e.g. apple, blackcurrant, mango, peach, pineapple, raspberry, strawberry, etc.).

There is no particular limit with regard to the relative amounts of porous tea granules and leaf tea in the beverage precursor. The inventors believe that use of a large amount of the porous granules in the beverage precursor may have a negative effect on the appearance, and thus the consumer acceptance of the beverage precursor. From the standpoint of balancing infusion performance with consumer acceptance it is preferred that the weight ratio of porous tea granules to leaf tea is from 5:1 to 1:5, more preferably from 4:1 to 1:4, still more preferably from 3:1 to 1:3, and most preferably from 2:1 to 1:2.

It is preferred that the mass of the beverage precursor is at least 1 g, as smaller amounts are difficult to accurately portion and dose. More preferably the mass is at least 1.2 g, and most preferably at least 1.4 g. It is further preferred that the mass of the beverage precursor is less than 4 g, as larger amounts become inconvenient to store and/or handle. More preferably the mass is less than 3 g, and most preferably less than 2 g.

The beverage precursor may be prepared via any suitable method. For example, by combining porous tea granules according to the present invention with leaf tea, wherein at least 90% by weight of the leaf tea has a particle size of −5+30 mesh. This process may optionally contain the additional and subsequent step of packaging the beverage precursor, preferably in an infusion packet.

As used herein the term "comprising" encompasses the terms "consisting essentially of" and "consisting of". All percentages and ratios contained herein are calculated by weight unless otherwise indicated. It should be noted that in specifying any range of values or amounts, any particular upper value or amount can be associated with any particular lower value or amount. Except in the operative and comparative examples, all numbers in the description indicating amounts of materials, conditions of reaction, physical properties of materials, and/or use are to be understood as being preceded by the word "about". The various features of the embodiments of the present invention referred to in individual sections above apply, as appropriate, to other sections mutatis mutandis. Consequently features specified in one section may be combined with features specified in other sections as appropriate. The disclosure of the invention as found herein is to be considered to cover all embodiments as found in the claims as being multiply dependent upon each other. Unless defined otherwise, all technical and scientific terms used herein have the same meaning as commonly understood by one of ordinary skill in the art in the field of tea processing.

EXAMPLES

The following non-limiting examples illustrate the present invention.

Example 1

The confocal images of black leaf tea and tea granules shown in FIGS. 1 and 2 were obtained as follows. The dry granules/particles were placed in a 35 mm glass bottom culture dishes with a 14 mm Microwell and No. 1.0 cover glass. Confocal laser imaging was performed using a Zeiss LSM-780 confocal scanning laser microscope (Carl Zeiss Ltd) with a 10×/0.45 objective. Image processing was accomplished using ZEN 2012 V software. Three laser excitation lines (405 nm, 488 nm and 561 nm) were used to excite the auto fluorescent molecules and emissions were collected with a PMT detector (429 to 474 nm), GaAsP detector (517 to 579 nm) and a second PMT detector (650 to 758 nm). 3D z-stack tiled images were obtained using a pixel dwell of 0.64 μs in sequential line-scanning mode with a zoom factor of 1.0, 2× line averaging and a z-step size of 8 μm. 3D composite fluorescent images were generated using the 3D rendition feature of the ZEN software in maximum intensity mode.

The black leaf tea (control) was standard PF1 grade material. This was obtained via standard tea processing in a Kenyan factory comprising standard plucking, withering, maceration, fermentation, drying and size grading.

The tea granules were prepared as follows:

a) Milling

A 160UPZ Impact Mill (Hosokawa Micron UK) was used to mill the standard PF1 grade material into fine particles of relative wider size distribution. The machine was operated at 6000 rpm at a feeding rate of 60 kg/hr. The grounds particle were then screened using ATS600 classifier (Allgaier GmbH) into different narrow size fractions of:

less than 150 μm,
150 to 250 μm,
250 to 425 μm, and
greater than 425 μm.

b) Granulation Protocol

Granulation was performed in an Aeromatic Fielder MP1 fluid bed granulator (GEA Process Systems). The granulation procedure may be divided into three steps, namely: heating, agglomeration and drying. A mass of 1 kg of ground tea particles (particle size 150 μm to 250 μm) was fluidized by maintaining the air flow between 10% to 20%. Temperature of the fluidizing particle bed was raised to 60° C. to 70° C. before introducing an aqueous solution of Saint Brite instant tea (Unilever) at 65% w/w through a two fluid nozzle at a flow rate of 25 to 30 ml/min using a peristaltic pump. The addition of aqueous binder caused the bed temperature to drop to around 50° C. The nozzle height and atomizing air pressure (at 0.75 bar) were kept constant throughout the study. A periodical blow back pressure of 0.5 bar was applied during the experiment to re-introduce any fine particles into the particle bed. The drying regime started immediately after completing the dosage of the liquid binder, and the experiment was terminated after fluidizing the particles at elevated temperature (70° C.) for further 10 to 15 minutes. Optionally, the granulated product was then further dried into a tray dryer at 80° C. for 2 to 3 hrs to ensure a moisture content in the final product of below 3 wt. %. The dried granules contained 16% w/w binder (Saint Brite instant tea), and had a D[4,3] particle size of 600 μm.

Example 2

The control material & tea granules were obtained & prepared as described above in Example 1.

The infusion performance of the porous tea granules was compared to that of control tea material. More specifically, three different amounts of control material and three different amounts of porous tea granules were compared. Table 2 shows the amounts of leaf tea or tea granules used in each case.

TABLE 2

| | Control A | Control B | Control C | Sample 1 | Sample 2 | Sample 3 |
|---|---|---|---|---|---|---|
| Leaf tea | 3.125 g | 2.5 g | 2.19 g | — | — | — |
| Tea granules | — | — | — | 3.125 g | 2.5 g | 2.19 g |

The infusion characteristics were determined using the dynamic method described in WO 2012/113602. The dynamic (continuous dunking) procedure represents a laboratory simulation of consumer preparation of an infusion involving agitation of a tea bag. Tea bags having the same size and geometry and made from the same filter material were used in all cases (tetrahedral tea bags). Absorbance was measured at 445 nm. The total infusion time was 120 seconds in a volume of 200 ml, and the sampling frequency was 1 sample per second.

Figure 3:
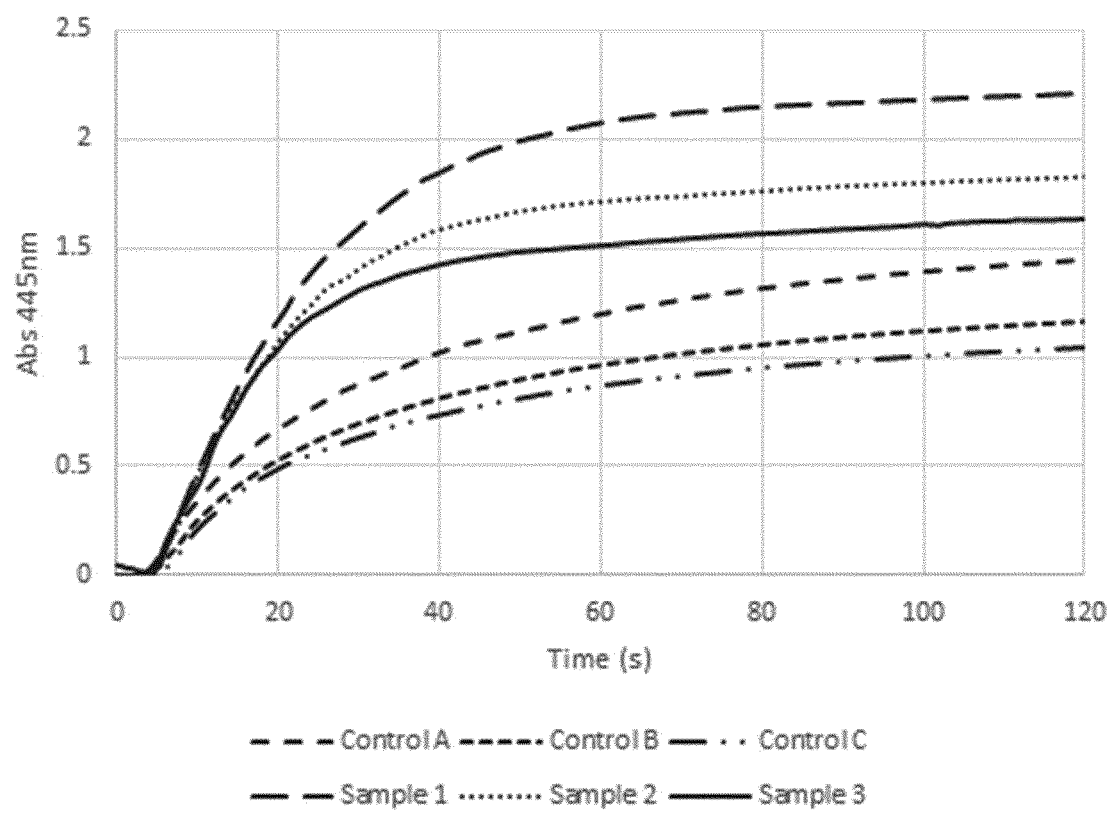
FIG. 3 shows infusion curves for tea granules in tea bags during dynamic dunking.

The infusion curves are shown in FIG. 3. Sample 1 (porous granules, standard bag weight), Sample 2 (porous granules, 20% bag weight reduction), and Sample 3 (porous granules, 30% bag weight reduction) have improved infusion performance compared with Control A (leaf tea, standard bag weight). Each of the samples also showed an improvement in infusion performance when compared to the appropriate control, i.e. Sample 1 against Control A (standard bag weight), Sample 2 against Control B (20% bag weight reduction), Sample 3 against Control C (30% bag weight reduction).

The level of soluble solids in the infusion liquors at the end of the dynamic procedure were measured. A 50 ml sample of the infusion liquor was taken and weighed using an accurate balance. This sample was allowed to dry completely in an oven for 16 hours, and then re-weighed. The difference between the mass of the initial infusion liquor and the mass of the dry sample was used to calculate the level of soluble solids in the infusion liquor. The results are shown in Table 3. The level of soluble solids released into the infusion liquor was significantly higher for Samples 1 and 3 compared to their respective controls (i.e. Controls A and C).

TABLE 3

| | Control A | Sample 1 | Control C | Sample 3 |
|---|---|---|---|---|
| Soluble solids in liquor | 0.473% | 0.748% | 0.327% | 0.515% |

The level of soluble solids released into the infusion liquor from the porous tea granules will include solids from the binder as well as solids from the leaf tea particles. This is in contrast to the control samples, where the soluble solids in the infusion liquor originate solely from the leaf tea material.

In order to establish that the improvement in infusion performance was not solely due to the presence of the binder, an estimate was made of the proportion of soluble solids extracted from the leaf tea particles. In order to do this, it was assumed that all of the solids contained in the binder were released into the infusion liquor. The remaining soluble solids in the infusion liquor over and above this level were considered to be obtained from the leaf tea particles. For the control samples, the soluble solids in the infusion liquor were obtained from the leaf tea.

TABLE 4

| | Control A | Sample 1 | Control C | Sample 3 |
|---|---|---|---|---|
| Proportion of soluble solids extracted from leaf component | 65.1% | 75.0% | 67.2% | 78.5% |

Table 4 shows the proportion of soluble solids extracted from the leaf component (i.e. leaf tea particles for Samples 1 and 3, leaf tea for Controls A and C). For Controls A and C, around two thirds of the soluble solids present in the leaf component were estimated to be released into the infusion liquor. Whereas for Samples 1 and 3, at least three quarters of the soluble solids present in the leaf tea particles were estimated to be released into the infusion liquor. This indicates that the improved infusion performance of the porous tea granules is not solely due to the presence of the binder. In other words, the leaf tea particles in the granules release a greater proportion of their constituent solids into the liquor than is the case for conventional (non-granulated) leaf tea.

The invention claimed is:

1. Porous tea granules comprising leaf tea particles and binder, wherein:
   at least 50% by weight of the leaf tea particles have a particle size of 100 μm to 300 μm;
   the binder is a tea-based binder comprising tea solids;
   the tea granules comprise binder in an amount of 1 to 40% by dry weight; and
   the porous tea granules have a D[4,3] of more than 350 μm.

2. The porous tea granules as claimed in claim 1 wherein the binder is a tea extract or a tea juice.

3. The porous tea granules as claimed in claim 1, wherein the tea granules comprise binder in an amount of 10 to 25% by dry weight.

4. The porous tea granules as claimed in claim 1, wherein the leaf tea particles are ground leaf tea particles.

5. The porous tea granules as claimed in claim 1, wherein the leaf tea having a particle size of 100 μm to 300 μm is black leaf tea.

6. The porous tea granules as claimed in claim 1, wherein the porous tea granules have a D[4,3] of more than 450 μm.

7. A beverage precursor comprising the porous tea granules as claimed in claim 1.

8. The beverage precursor as claimed in claim 7 wherein the beverage precursor additionally comprises leaf tea wherein at least 90% by weight of the leaf tea has a particle size of −5+30 mesh.

9. The beverage precursor as claimed in claim 8 wherein the weight ratio of porous tea granules to leaf tea is from 5:1 to 1:5.

10. The beverage precursor as claimed in claim 7, wherein the beverage precursor is packaged in an infusion packet.

11. The beverage precursor as claimed in claim 7, wherein the beverage precursor has a mass of 1 g to 4 g.

12. A process for manufacturing porous tea granules, the process comprising the steps of:
   (a) providing leaf tea;
   (b) grinding and/or sieving the leaf tea such that at least 50% by weight of the leaf tea has a particle size of 100 to 300 am;
   (c) forming a mixture comprising the leaf tea obtained in step (b) and binder;
   (d) forming porous granules from the mixture by low-shear granulation;
   wherein the porous tea granules have a D[4,3] of more than 350 am and wherein the binder is a tea-based binder comprising tea solids.

13. The process as claimed in claim 12 wherein steps (c) and (d) are performed simultaneously.

14. The process for manufacturing a beverage precursor wherein porous tea granules as claimed in claim 1 are combined with leaf tea, wherein at least 90% by weight of the leaf tea has a particle size of −5+30 mesh.

15. The process as claimed in claim 14 wherein the beverage precursor is packaged in an infusion packet.

* * * * *